June 26, 1956  D. H. HYATT ET AL  2,752,122
TRACTOR DRIVEN BORING IMPLEMENT
Filed Oct. 21, 1954   2 Sheets-Sheet 1
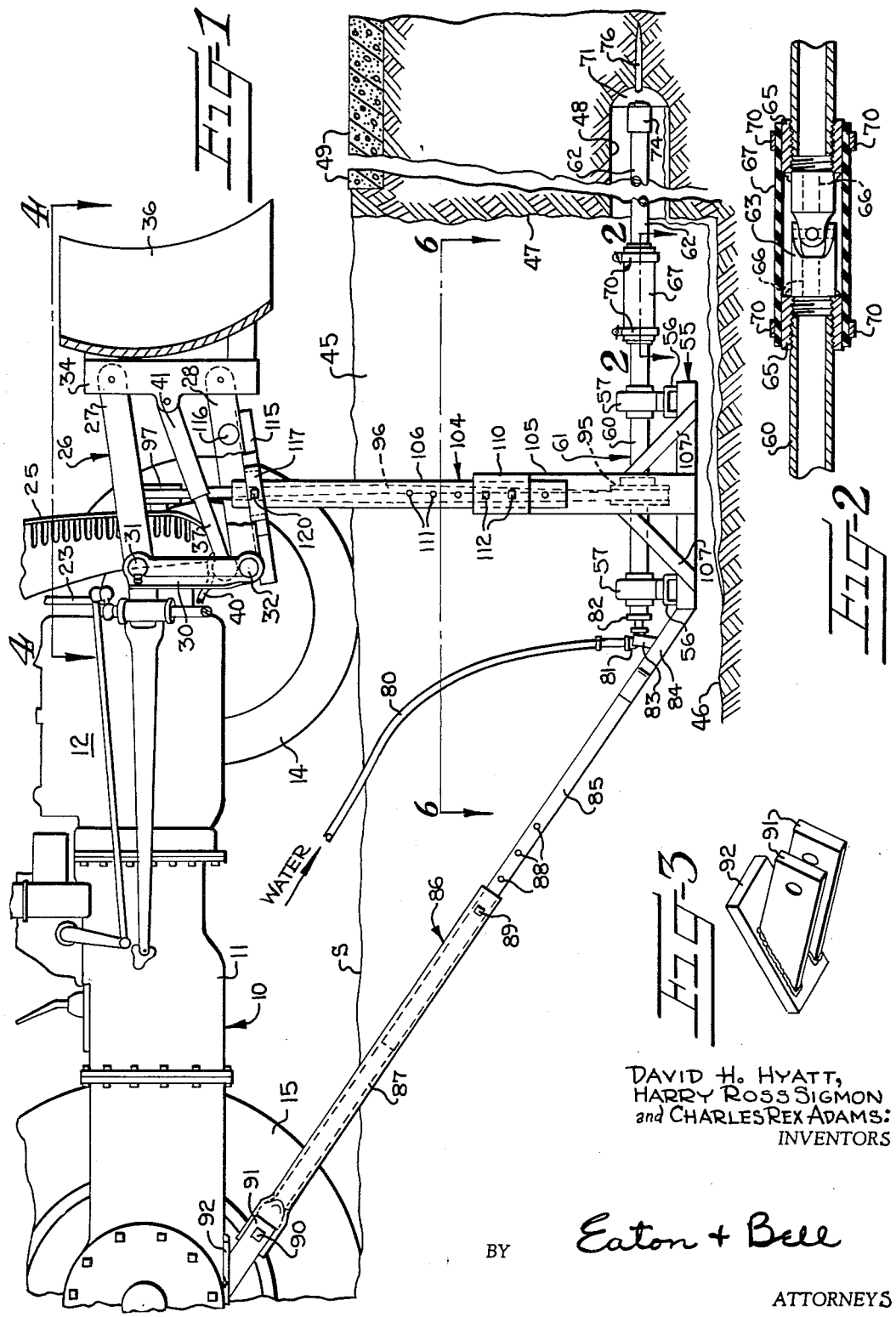
DAVID H. HYATT,
HARRY ROSS SIGMON
and CHARLES REX ADAMS:
INVENTORS
BY Eaton + Bell
ATTORNEYS June 26, 1956
D. H. HYATT ET AL
2,752,122
TRACTOR DRIVEN BORING IMPLEMENT
Filed Oct. 21, 1954
2 Sheets-Sheet 2
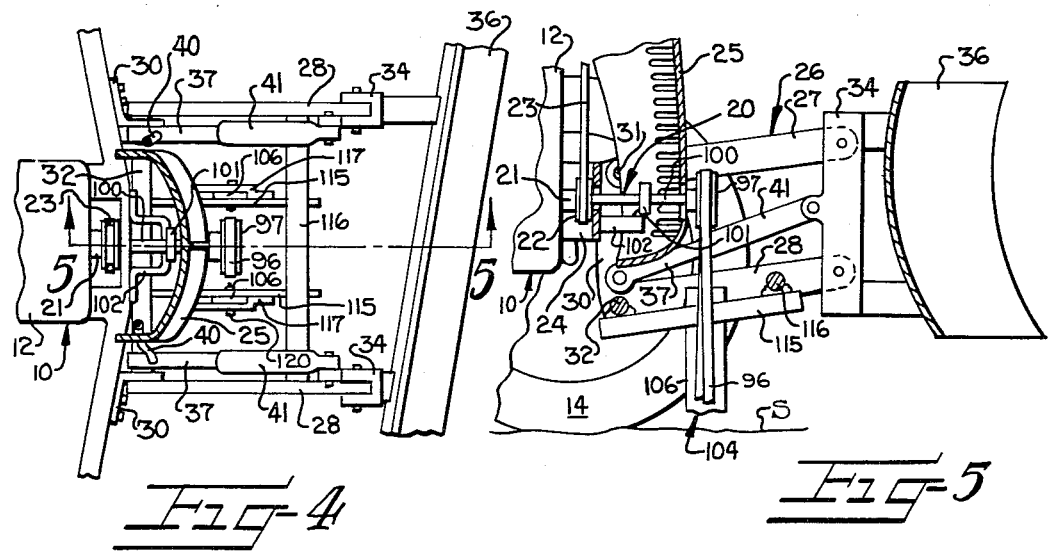
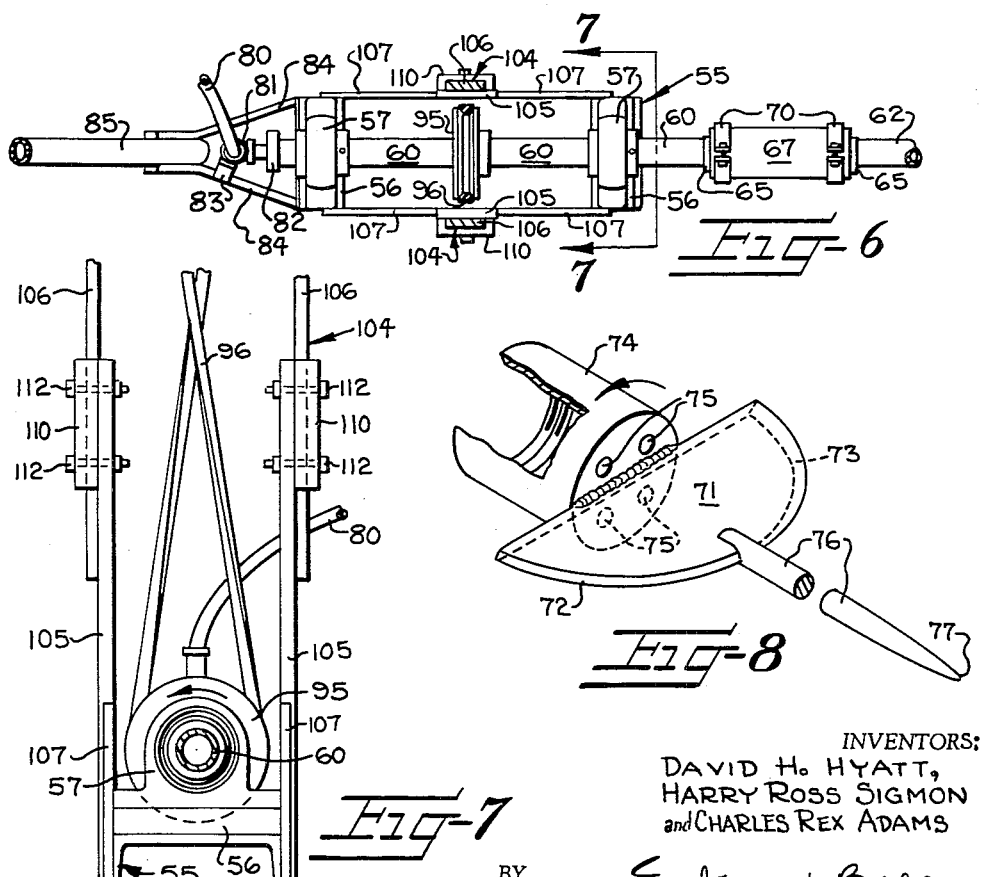
INVENTORS:
DAVID H. HYATT,
HARRY ROSS SIGMON
and CHARLES REX ADAMS
BY Eaton + Bell
ATTORNEYS

United States Patent Office 2,752,122
Patented June 26, 1956

2,752,122

TRACTOR DRIVEN BORING IMPLEMENT

David H. Hyatt, Statesville, Harry Ross Sigmon, Stony Point, and Charles Rex Adams, Statesville, N. C.; said Hyatt assignor to said Sigmon and said Adams Application October 21, 1954, Serial No. 463,692

5 Claims. (Cl. 255—20)

This invention relates to earth boring apparatus and, more especially, to an improved horizontal boring apparatus of the character employed for boring holes under paved streets, highways, driveways and the like for the insertion of water, gas or other pipes.

It is a primary object of this invention to provide an earth boring apparatus of the character described which is supported by and driven by the engine of a tractor or other automotive wheeled vehicle.

It is another object of this invention to provide an improved boring apparatus which is made from relatively few parts; may be economically manufactured and maintained; which is relatively light in weight, and which may be readily connected to a conventional wheeled automotive vehicle, such as a farm tractor.

It is another object of this invention to provide an improved earth boring apparatus of the character last described comprising a horizontal base supporting a novel form of drill or bit thereon and having a pair of spaced substantially vertical extensibly adjustable frame members or arms thereon adapted to be pivotally connected to the hydraulically operated lifting means at one end of a tractor and also having at least one other extensible frame member or arm extending upwardly and outwardly therefrom at an angle and which is adapted to be pivotally connected to a lower portion of the tractor spaced substantially from said lifting mechanism and wherein rotary motion is imparted to the drill or bit by the engine or power take-off of the tractor.

Thus, a trench may be dug adjacent the portion of the earth in which the horizontal passageway is to be formed, whereupon the base of the implement may be placed on the bottom of the trench and the frame members or arms thereof connected to the hydraulic lift and the rear portion of the tractor, respectively, and a driving connection, such as an endless belt, may then be formed between the power take-off of the tractor and the boring bit or drill. Thereafter, the hydraulic lift may be actuated to raise the implement off the bottom of the trench and it is then merely necessary to move the tractor along the ground at a relatively slow speed to cause the implement to move therewith and, in so doing, the boring bit or drill will form a passageway in the earth adjacent said trench with movement of the tractor toward the corresponding end wall of the trench.

Some of the objects of the invention having been stated, other objects will appear as the description proceeds, when taken in connection with the accompanying drawings, in which—

Figure 1 is a sectional view through a trench showing the improved boring apparatus in use and showing a portion of a tractor disposed thereabove;

Figure 2 is an enlarged fragmentary longitudinal sectional view through the improved boring bit or drill taken substantially along line 2—2 in Figure 1;

Figure 3 is an isometric view of a suitable bracket employed for connecting the upper end of the angularly disposed extensible frame member or arm of the implement to the lower portion of the tractor;

Figure 4 is a fragmentary plan view, partially in section, taken substantially along line 4—4 in Figure 1 and showing the connection between the improved implement and the hydraulic lift mechanism of the tractor, but omitting a substantial portion of the improved earth boring implement;

Figure 5 is a fragmentary longitudinal vertical sectional view taken substantially along line 5—5 in Figure 4;

Figure 6 is a fragmentary sectional plan view, partially in section, and with parts broken away, taken substantially along line 6—6 in Figure 1;

Figure 7 is an enlarged fragmentary elevation, partially in section, taken substantially along line 7—7 in Figure 6;

Figure 8 is an enlarged isometric detail of the head or cutting means on the free end of the boring bit or drill.

Referring more specifically to the drawings, the numeral 10 broadly designates a suitable automotive vehicle which is shown as a tractor and shall hereinafter be referred to as such. However, it is to be understood that any desired wheeled automotive vehicle having its own engine may be used for supporting and driving the improved earth boring implement. The tractor 10 comprises a frame 11 which supports an engine or motor 12. The motor 12 imparts forward and rearward motion to the tractor, which tractor is supported on front and rear wheels 14 and 15, respectively.

There are many tractors which have a power take-off at the front end thereof and the tractor illustrated in the drawings is of the Ford type to the front end of the drive shaft of the engine of which a fabricated power take-off 20 is connected. The portion of the crank shaft to which the power take-off 20 is connected is indicated at 21 in Figures 4 and 5 and has the usual grooved pulley 22 thereon for driving an endless belt 23 connected to the usual engine cooling fan, not shown, of the vehicle or tractor. A suitable shield 24 is usually provided for enclosing the front end of the crank shaft 21 and the pulley 22, the shield 24 being a part of the frame of the tractor 10. The tractor is also provided with a conventional grid or radiator shield 25 on the front end thereof.

The tractor 10 is provided with a hydraulic lift mechanism broadly designated at 26 which, in this instance, is positioned adjacent the front end of the crank shaft 21 and includes upper and lower laterally spaced pairs of parallel arms, levers or links 27, 28. The rear ends of the upper links 27 are pivotally connected, as at 31, to depending bars or portions of the frame 11 of the tractor. The rear ends of the lower arms or links of the lift mechanism 26 are fixed on a transverse shaft 32 which is also oscillatably mounted in the frame of the tractor 10 in spaced relationship below the pivot points 31 of the links 27.

The front ends of the upper and lower pairs of links 27, 28 are pivotally connected to corresponding pairs of substantially upright bars or frame members 34 to which a suitable earth-moving scraper blade 36 may be secured, if desired. Pivotally connected to the tractor frame portions 30 are the rear lower ends of a pair of laterally spaced cylinders 37 having respective conduits or pipes 40 extending therefrom to the usual manually controlled fluid pressure means or hydraulic system, not shown, of the tractor 10 for imparting outward movement to a corresponding pair of piston rods 41. The front ends of the piston rods 41 are pivotally connected to the medial portions of the corresponding upright bars or frame members 34 of the lift mechanism 26.

The tractor is preferably provided with a suitable trench digging apparatus, not shown, for digging a trench 45 upon whose bottom 46 the base of the improved implement may rest during the installation of the improved implement on the tractor, and in whose end wall 47 a hole or passageway 48 is to be formed in order that a pipe or pipes may be laid therethrough without disturbing the paving 49 beneath which the hole 48 is to be formed.

Of course, the trench 45 may be formed by any desired means and it is merely indicated above that the trench 45 is preferably formed by conventional means carried by the tractor 10 in order to enhance the utility of the present invention. The parts of the tractor 10 heretofore described are shown by way of example and it is with such or similar parts that the present invention is adapted to be associated.

The improved boring implement comprises a base broadly designated at 55 which is in the form of a substantially rectangular plate or channel bar and which has a pair of forwardly and rearwardly spaced bearing supporting members 56 suitably secured thereto, on which corresponding bearing blocks 57 are suitably secured, as by welding, these bearing blocks 57 preferably, but not necessarily, being of the anti-friction type, and which rotatably support a rear pipe section or tubular section 60 of a boring bit or tool broadly designated at 61 (Figure 1).

The boring bit or tool 61 also comprises a front or operating pipe section or tubular section 62 which may also be termed as an extension and is universally connected to the front end of the rear tubular section 60 by means of a universal joint 63. It will be observed in Figure 2 that the forward and rearward parts of the universal joint 63 are each provided with an internally threaded coupling 65 thereon for threadably receiving the proximal ends of the tubular sections 60, 62. The two end sections of the universal joint 63 are provided with axial passageways or bores 66 therethrough and, in order to prevent fluid from leaking at the universal joint 63, a suitable flexible boot or tube 67, preferably made from rubber or similar material, encloses the universal joint 63 and is suitably secured to the internally threaded couplings 65, as by strap clamp members 70. It is apparent that the boot 67 tends to maintain the two universally interconnected parts of the universal joint 63, and consequently the pipe sections 60, 62, in substantially axial alinement.

The boring bit or drill extension 62 may be of the screw type, if desired. However, it will be observed in Figures 1 and 8 that a novel form of cutting means or boring head is provided, which boring head comprises a flat substantially semi-circular blade 71 having oppositely beveled cutting edges 72, 73 on opposite segmental forward portions thereof. The blade 71 is suitably secured, as by welding, to the outer end of an internally threaded fitting or cap 74 threadably secured on the free end of the drill bit extension 62. The cap or fitting 74 is of greater dimensions than the thickness of the relatively thin blade 71 and has a plurality of perforations, holes or ports 75 therein disposed adjacent opposite sides of the blade 71 for directing water or other liquid adjacent the blade 71 during the boring operation.

In order to guide the blade 71 and to prevent creeping of the blade 71 during the drilling operation, the central portion of the blade 71, at the juncture of the oppositely beveled edges 72, 73, has an elongated spear-head 76 suitably secured thereto, which is shown in the form of a round rod having a rounded or substantially pointed end 77 thereon for piercing the earth in advance of the blade 71.

Water is supplied to the boring tool 61 from a convenient source of supply through a hose or conduit 80 which is connected to the rear end of the rear section 60 of the boring tool 61 by means of a pipe elbow 81 connected to a suitable rotary pipe connection 82 fixed to the rear end of the rear pipe section 60 of the boring tool 61.

The rotary connection 82 may be of any desired or conventional construction, and a detailed description thereof is deemed unnecessary. In order to prevent undue stress on the rotary connection 82, the pipe elbow 81 is preferably anchored by means of a bracket 83, suitably secured to the pipe elbow 81 and also being suitably secured to one of a pair of upwardly inclined converging bars 84 whose lower ends are suitably secured to the rear end of the base 55, adjacent opposite side edges thereof. The upper ends of the bars 84 are suitably connected to the lower end of the lower portion 85 of an inclined extensible or telescoping frame member or brace broadly designated at 86.

The lower section 85 of the telescoping brace or frame member 86 is adjustable within a relatively movable tubular upper section 87 of the telescoping arm or brace 86. In order to permit adjustment of the length of the telescoping arm 86, the lower section 85 has a plurality of longitudinally spaced holes therein in which a bolt, penetrating upper section 87, may be positioned for forming the telescoping frame member 86 in the desired length. The upper end of upper section 87 is pivotally connected, as at 90, between the inclined legs 91 of a bracket 92. The bracket 92 is suitably secured to the frame 11 of the tractor, preferably at a point midway between the rear wheels 15 thereof substantially as shown in Figure 1.

Fixed on the rear tubular section or pipe section 60 of the boring tool 61 is a pulley or wheel 95 which is engaged by an endless belt 96 which extends upwardly and is also mounted on a pulley or wheel 97 which is a part of the power take-off 20. The power take-off 20 also comprises a relatively short shaft 100 which loosely penetrates the lower portion of the shield or grid 25, is journaled intermediate its ends in a bearing block 101, loosely penetrates the guard 24 and is suitably secured in the forward end of the crank shaft 21. The bearing block 101 is suitably secured, as by welding, to a substantially U-shaped bracket 102 fixed to the guard 24.

It will be observed in Figures 1, 6 and 7 that the base 55 has a pair of substantially vertically disposed extensible or telescoping frame members thereon, broadly designated at 104, each including a lower frame section 105 and an upper frame section 106, the lower ends of the lower frame sections 105 being suitably secured to opposite sides of the base 55 adjacent the central portion thereof and being reinforced by suitable diagonal braces 107. Each of the upper frame sections 106 is in the form of a bar mounted for vertical adjustment in a guide block 110 suitably secured to, or formed integral with, the upper portion of the corresponding lower frame section 105. Each of the upper frame sections 106 is provided with a plurality of longitudinally or vertically spaced perforations or holes 111 therein in certain of which bolts 112 may be positioned for securing the upper sections of the substantially vertically disposed telescoping frame members 106, 105 to the lower sections thereof, said bolts 112 penetrating the guide blocks 110 and the corresponding lower frame sections 105.

The upper ends of the upper frame sections 106 of the substantially vertically disposed telescoping frame members 104 may be pivotally connected to the hydraulic lift mechanism 26 in any desired manner. In this instance, a pair of laterally spaced supports 115 are suitably secured, adjacent their rear ends, to the shaft 32 and are spaced inwardly of and extend substantially parallel to the corresponding pair of lower links 28. The front portions of the supports 115 are suitably secured to a transverse shaft or bar 116 whose opposite ends are suitably secured to the lower links 28 adjacent the forward ends thereof. Each of the supports 115 has a suitable guide block 117 suitably secured thereto, and the upper end of the upper frame section 106 of the corresponding telescoping frame member 104 penetrates the corresponding guide block 117 and is pivotally connected thereto, and to the corresponding support 115, as by a bolt 120.

*Method of operation*

Prior to attaching the improved boring implement to the tractor, the blade 36 may be used in the usual manner for forming a smooth substantially horizontal surface S on the earth adjacent the pavement 49, after which the trench 45 may be formed in the manner heretofore described. Thereafter, the improved implement may be placed in the trench 45 with the base 55 thereof resting upon the bottom 46 of the trench 45 and the tractor 10 may then be moved into position thereabove with its front and rear wheels 14, 15 straddling the ditch 45.

The lift mechanism 26 is then lowered somewhat from the position shown in Figure 1 and the extensible or telescoping frame members 86, 104 would then be adjusted to the desired length so their upper ends may be connected to the arms 91 on bracket 92 and to the lift mechanism 26 in the manner heretofore described. Of course, the engine or motor 12 would not be running at this time and the endless belt 96 would then be positioned on the pulleys or wheels 95, 97. It might be stated here that a driveway pavement 49 is of substantially less width than a pavement of a highway and it has been found practicable to use a pipe section approximately eight feet long to serve as the shank of the front section 62 of the boring bit 61. However, where a wider pavement exists, the length of the front section 62 of the boring bit 61 may be easily increased by merely removing the internally threaded fitting 74 from the pipe section shown and coupling an additional section thereto and then reinstalling the fitting 74 of the boring head on the free end of the added section of pipe.

The next step in the operation of the improved implement involves directing fluid pressure into the cylinders 37 to cause the piston rods 41 to move outwardly or forwardly and to thereby elevate the lift mechanism 26 and to simultaneously elevate the improved implement and to lift the base 55 off of the bottom 46 of the trench 45. Assuming that the engine 12 is then running, it is apparent that the power take-off 20 then drives the boring bit 61 and water or other liquid is then directed into the boring bit 61 through the hose 80 and escapes through the ports 75 in the cap 74 of the cutting head. The operator then merely causes the tractor 10 to move forwardly along the surface S at a relatively slow speed so the spearhead 76 pierces the earth and so the blade 71 then cuts away the earth to form the passageway or hole 48. The continuous flow of liquid or water into the trench adjacent the cutting blade 71 softens the immediately surrounding earth and also washes the earth out of the passageway 48 as the boring bit 61 passes thereinto in forming the passageway 48. As the tractor 10 is initially moved forwardly, another operator may loosely support the forward drill section 62, so it may rotate freely as said other operator guides the point or spear-head 76 into the wall 47. This may be necessary because of the universal connection 63 and boot 67 at the junctures of the drill sections 60, 62.

The improved boring implement is particularly useful in boring holes in relatively soft or clay-like earth. However, if relatively large rocks or bolders are encountered, the operator of the tractor need merely stop the tractor. Thereafter, further rotation of the blade 71 and the further admittance of water into the hole 48 will usually wash away the dirt from around the rock and form an enlarged pocket into which the rock can fall, after which the drilling operation may be resumed. If, for example, a relatively large rock or other immovable obstruction is encountered, by the tractor 10 or the spear-head or both, the universal joint 63 permits the forward section 62 of the boring bit 61 to be deflected from its path, since the front section 62 need not necessarily be maintained in axial alinement with the rear section 60. When the drilling operation has been completed, the shank or forward section 62 of the tubular boring bit 61 may be removed from the corresponding coupling 65 (Figure 2) and withdrawn from the passageway 48 in either direction, or the tractor may merely be moved over the surface S in the opposite direction to back the front extension or section 62 of the boring bit 61 out of the hole 48.

It is thus seen that we have provided a novel earth boring implement which may be readily attached to and controlled and driven by the engine of a tractor or similar conveyance or vehicle so the tractor 10 can be used for other purposes when the boring implement is not in use, such as for grading the earth or for forming trenches, such as trench 45.

It is also seen that we have provided means facilitating the easy installation and removal of the improved implement relative to the tractor and have so constructed the implement that it can be easily and economically manufactured and maintained, has a minimum of parts, will operate efficiently, and is light in weight.

It is contemplated that the upper ends of the upright telescopic frame members 104 may be attached to the frame 11 of the tractor. However, the base 55 must then be elevated manually or by means other than the lift 26 so the implement may subsequently be moved freely above the trench bottom 46. The use of the implement with a lift mechanism, such as 26, is not only desirable for the installation of the implement on the tractor, but also enables raising and lowering the implement to allow for variations in the attitude of the tractor during each boring operation. For example, the terrain may be inclined adjacent the paving 49 and, if a substantially level passageway is to be formed, it is apparent that the lift mechanism would then have to be gradually raised or lowered, as the case may be, in order that the front end of the rear drill section 60 would be maintained at the proper level for maintaining the shank of the forward drill section in substantial alinement with the axis of the hole being formed.

In the drawings and specification, there has been set forth a preferred embodiment of the invention and, although specific terms are employed, they are used in a generic and descriptive sense only and not for purposes of limitation, the scope of the invention being defined in the claims.

We claim:

1. An earth boring attachment for a tractor, said tractor having a lift mechanism at its lower forward end and a power take-off also disposed at the forward end of said tractor; said earth boring attachment comprising a base, a pair of laterally spaced substantially vertically disposed frame members fixed to said base and extending upwardly therefrom, means pivotally connecting the upper ends of said frame members to said lift mechanism, at least one upwardly and rearwardly inclined frame member fixed to the rear portion of said base, means pivotally connecting the upper end of said inclined frame member to the rear portion of said tractor, a substantially horizontal tubular boring tool having a rear portion journaled on said base and a front portion extending forwardly substantially beyond the vertical plane of said base, means pivotally and communicatively connecting the rear end of the front portion to the front end of the rear portion of said boring tool, the forward end of the front portion of said boring tool having at least one port therein, a blade fixed to said front portion, means for directing water into said tubular boring tool whereby it is exhausted through said port, and driving connections between said power take-off and said boring tool for imparting rotation to the boring tool.

2. An earth boring attachment for a tractor, said tractor having a lift mechanism at its lower forward portion, a power take-off also disposed at the forward end of said tractor; said earth boring attachment comprising a base, a pair of laterally spaced substantially vertically disposed frame members fixed to said base and extending upwardly therefrom, means pivotally connecting the upper ends of said frame members to said lift mechanism, an upwardly and rearwardly inclined frame member fixed to the rear portion of said base, means pivotally connecting the upper end of said inclined frame member to the rear portion of said tractor, a substantially horizontal tubular boring tool having its rear portion journaled on said base and extending forwardly substantially beyond the vertical plane of said base, a cap closing the forward end of said boring tool and having a plurality of ports therein, a relatively thin blade fixed to the front end of said cap and extending outwardly beyond opposite sides of said cap, means for directing water into said tubular boring tool whereby it is exhausted through said ports adjacent said blade, and driving connections between said power take-off and said boring tool for imparting rotation to the boring tool.

3. A structure according to claim 2 wherein each of the frame members comprises a lower section and an upper section, and means for adjusting the upper section of each frame member relative to the lower section thereof.

4. A structure according to claim 2 wherein said tubular boring tool comprises a rear pipe section journaled on said base and a forward pipe section, a universal connection between the proximal ends of the rear and forward pipe sections, and said universal connection having passageways therein to permit the water to flow between the two pipe sections.

5. An earth boring attachment for a tractor, said tractor having a lift mechanism at its forward portion and also having a power take-off at its forward end; said attachment comprising a base, at least one first frame member fixed to said base and extending upwardly therefrom, means pivotally connecting the upper end of said frame member to said lift mechanism, at least one second frame member fixed to the rear portion of said base and inclining upwardly and rearwardly from said base, means pivotally connecting the upper end of said second frame member to the rear portion of said tractor, a substantially horizontal tubular boring tool having a rear portion journaled on said base and a front portion extending forwardly substantially beyond the vertical plane of said base, means pivotally and communicatively connecting the rear end of the front portion to the front end of the rear portion of said boring tool, the forward end of the front portion of said boring tool having at least one port therein, a blade fixed to said front portion, means for directing water into said tubular boring tool whereby it is exhausted through said port, and driving connections between said power take-off and said boring tool for imparting rotation to the boring tool.

References Cited in the file of this patent
UNITED STATES PATENTS

| | | |
|---|---|---|
| 1,865,853 | Granville | July 5, 1932 |
| 1,932,068 | Englebright et al. | Oct. 24, 1933 |
| 1,943,103 | Benson | Jan. 9, 1934 |
| 2,665,117 | Ivey | Jan. 5, 1954 |
| 2,694,549 | James | Nov. 16, 1954 |